Dec. 5, 1950  G. R. LARKIN  2,532,316
AUTOMATICALLY RELEASABLE COVER
FOR AIRCRAFT PITOT TUBES
Filed Aug. 2, 1948
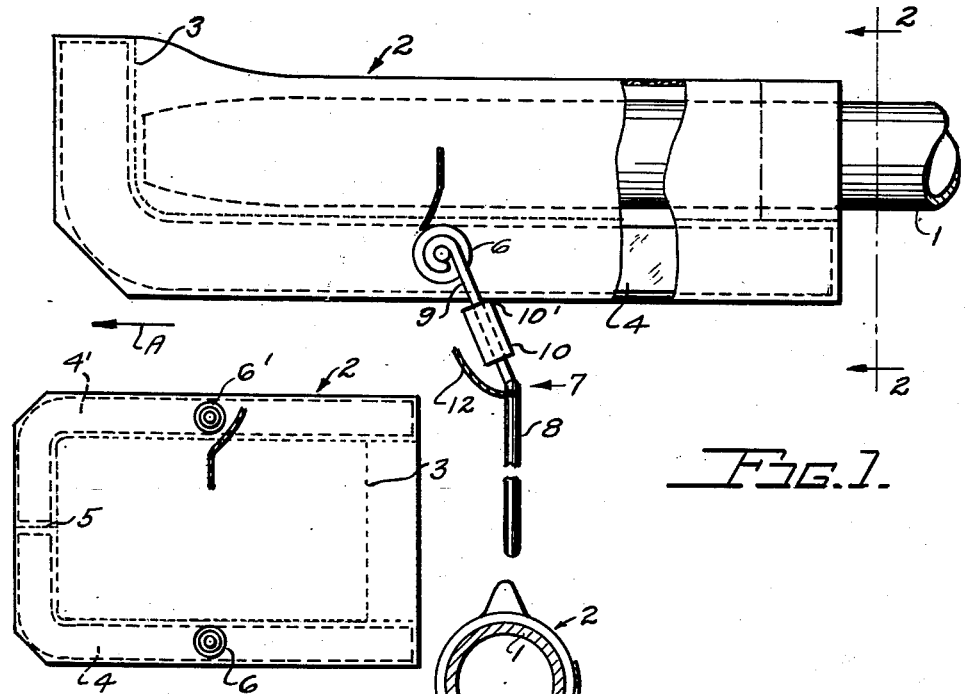
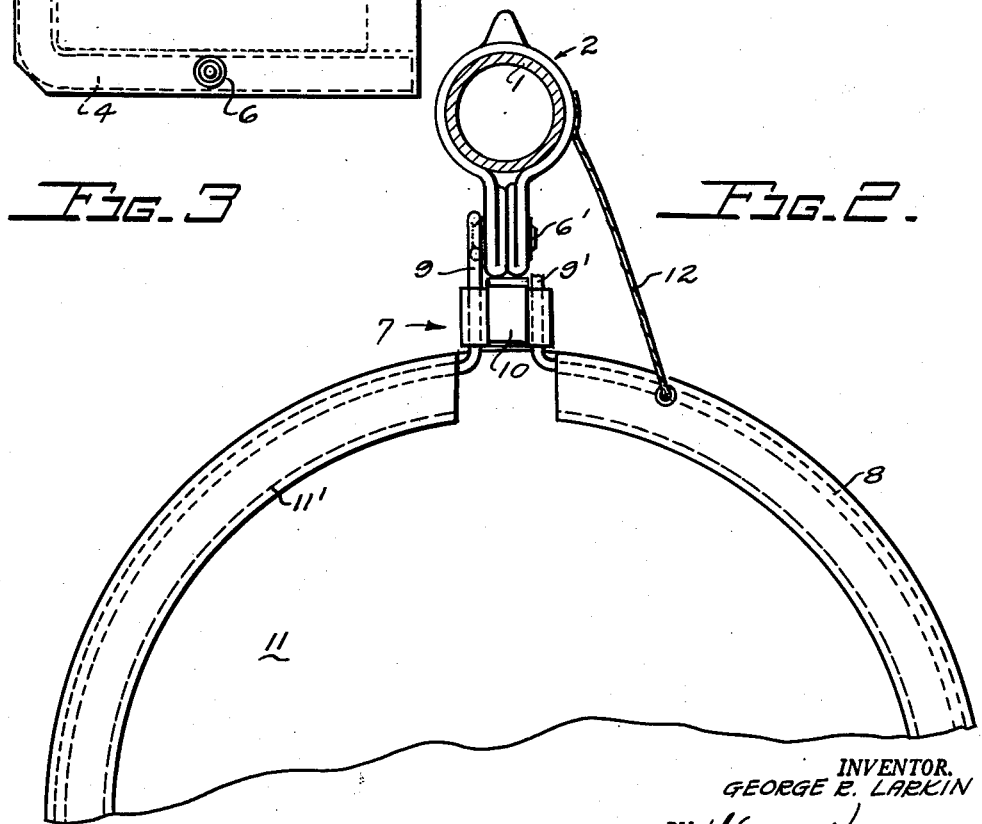
INVENTOR.
GEORGE R. LARKIN Patented Dec. 5, 1950

2,532,316

UNITED STATES PATENT OFFICE 2,532,316

AUTOMATICALLY RELEASABLE COVER FOR AIRCRAFT PITOT TUBES

George R. Larkin, Dayton, Ohio

Application August 2, 1948, Serial No. 42,122

9 Claims. (Cl. 150—52)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a cover for a Pitot tube as employed on aircraft, and relates particularly to such a cover which is automatically released from the tube when the aircraft is set in motion.

The primary object of the invention is to provide a flexible cover for application to an aircraft Pitot tube and including a cover closing or latching unit adapted to be released from the cover by air pressure resulting from forward motion of the aircraft.

Modern aircraft always carry one or more forwardly projecting Pitot tubes have small openings therein for detecting velocity head and static head in the air when the aircraft is flying. The connections from the tube to the instruments in the aircraft usually extend through the wing, since the tube is carried a considerable distance outboard along the wing. The instruments which may thus require connections with the tube are the air speed indicator, the rate of climb indicator and possibly the altimeter. In any case the tube must be protected when the aircraft is on the ground to prevent entry of insects and dust but once the aircraft takes off the cover must be removed or the instruments connected to the tube will not operate. In the past it was found that the airport attendants might very easily overlook the tube cover and after the aircraft was in the air it was impossible to remove the cover. Accordingly the present invention solves this dilemma by providing an efficient tube cover which will remove itself if through neglect someone fails to remove it prior to the takeoff.

Another object of the invention is to provide a Pitot tube cover of universal application regardless of the cross sectional shape of the tube and at the same time include cover releasing means responsive to air pressure at moderate speeds of the aircraft carrying the Pitot tube.

Another object of the invention is to provide a safety device to ensure removal of Pitot tube covers before the aircraft carrying the tubes are in full flight.

The above and other objects of the invention will become apparent upon reading the following detailed description in conjunction with the drawing, in which:

Fig. 1 is a side elevation view showing the present tube cover in place on the forward end portion of an aircraft Pitot tube.

Fig. 2 is an end elevation view of the present tube cover with part of the latching unit broken away. This view is taken on the vertical line 2—2 of Fig. 1.

Fig. 3 is a plan view of the present tube cover in open position but omitting the automatically releasable securing device. Fig. 3 is drawn to a reduced scale.

For a detailed description of the invention reference is made to Fig. 1 which shows the forward end of a Pitot tube 1 or other member to be covered temporarily by the purse-like cover 2. The cover itself, shown opened out flat in Fig. 3, is made of a strong textile fabric and is preferably lined with a light grade of felt. The peripheral edges of the cover are turned under and stitched securely in place, as indicated by stitching 3. Enclosed within portions of the deep hem are two L-shaped metal strips 4 and 4', which are preferably made of spring steel. The parallel longitudinally extending portions of these strips are bowed slightly, so that the central portions thereof are held apart when the two halves of the cover are folded one on the other. The cover is further stitched across the hem at 5 between the adjacent end portions of the strips 4 and 4'. The portion of the cover between these adjacent end portions forms a hinge connection between the stiff metal strips, so that the cover tends naturally to fold up along the longitudinal center line when it is grasped by an attendant. When so folded it forms a weather-tight cover adapted to be slid endwise over the tapered end of the Pitot tube. The cover is closed on the top by the fabric itself and on the bottom and one end by the stiff hemmed portions which enclose the metal strips 4 and 4'. Exposed on the outside of the cover are two opposite latching studs or detents 6 and 6' having rivet-like inner ends extending through the cover fabric and riveted over on the undersides of the strips 4 and 4'. As best shown in Fig. 2 the detents 6 and 6' are provided with frusto-conical end portions, but may be merely rounded off like a round-headed rivet. These end portions cooperate with a latching device to be described below to maintain the cover in closed relation on the Pitot tube.

When the cover 2 is folded over the end of the tube 1, as shown in Fig. 1, the strips 4 and 4' and the fabric surrounding the strips will be in adjacent superimposed relation thus closing the cover except at the right hand end where the tube 1 enters. The tube is therefore fully protected at its free end from dust, insects, snow, sleet and rain. In order to hold the cover tightly closed, the latching unit 7 is provided to snap over the outer end portions of the detents 6 and 6'. The unit 7 comprises a stiff wire hoop 8 provided with upstanding spaced end portions 9 and 9', each of which includes a looped upper end portion forming an eyelet capable of latching engagement with the outer ends of the studs or detents 6 and 6'. The end portions 9 and 9' are retained in spaced rigidly-connected relation by a metal tie plate 10, having opposite curled ends soldered or otherwise fastened securely to the end portions 9 and 9' of the hoop 8. The end portions 9 and 9' have sufficient resilience to be spread apart slightly as they are snapped over the studs 6 and 6' to retain the cover in closed or folded relation. The ends of the studs are of such proportions as to fit within the eyelet portions of elements 9 and 9', but are also capable of being released therefrom by sufficient lateral pressure. The strips 4 and 4' being bowed apart in the middle as explained above, the studs 6 and 6' are thus retained more securely in the eyelets, especially in case the end portions 9 and 9' should become spread apart more after repeated use of the latching unit. In Fig. 2 the end portion 9' has its upper looped end removed to better show the stud 6'.

With the latching unit 7 in place as shown (Figs. 1 and 2) the hoop 8 will hang vertically downwardly with the tie plate preferably in contact with the lower edges of the cover structure as shown at 10' (see Fig. 1). The hoop 8 is covered with a sheet of thin cloth or other sheet material 11 and this material may be held in place by stitching 11'. The covered hoop, which may be termed a deflector, is enameled with white, yellow or orange enamel for maximum visibility and the deflector is permanently attached to the cover 2 by means of a short length of heavy cord or braided wire 12.

In use the cover 2 is installed as above described on the free end of the Pitot tube 1, and with the aircraft stationary the latching unit 7 may swing back and forth in the wind to a limited extent. Now assume that the aircraft takes off with the cover 2 still in place on the end of tube 1 and that the aircraft moves forward in the direction of the arrow A at a high rate of speed. At about 60 miles per hour there will be sufficient air pressure on the deflector 8, 11 to cause the latching unit to pivot in a counterclockwise direction (Fig. 1) about the fulcrum point 10', at the same time forcing the end portions 9 and 9' of the hoop 8 laterally off the studs 6 and 6'. This action in turn allows the latching unit 7 to drop down free of the cover and the cover then tends to snap open due to the resilience of the bowed longitudinal portions of the strips 4 and 4'. In any event the air flowing past the tube 1 immediately blows the cover 2 with the attached latching unit 7 free of the tube and the whole assembly will then flutter to the ground, to be later retrieved by an attendant.

In a cover and latching structure as shown and described it has been found that with a deflector about seven inches in diameter there will be nearly one and one-half pounds of air pressure developed thereon at 60 miles per hour and that this pressure is sufficient to force the end portions 9 and 9' of the hoop 8 off the studs 6 and 6'. This force of one and one-half pounds may be considered as concentrated at the geometrical center of the deflector 8, 11 and as may be readily seen the lever arm with respect to the fulcrum point 10' is much greater than the lever arm from the fulcrum point up to the latching eyelets of end portions 9 and 9' of the hoop 8. Thus the force times distance ratios may be equated and the design characteristics of the latching unit 7 may be worked out precisely before the device is constructed. By using a deflector enameled or colored for high visibility, the airport attendant or aircraft pilot is very likely to see that the cover is on the Pitot tube and remove it before the aircraft is ready to take off. However if the cover is not removed and it is blown off later, the airport attendant will have no trouble locating the assembly on the airfield. While Figs. 1 and 2 are drawn to approximately full scale it should be understood that the relative dimensions and proportions may be varied considerably and any dimensions cited above are merely furnished to more fully describe the preferred embodiment of the invention. The metal strips 4 and 4' of L-shaped configuration are not directly connected together but merely hinge with respect to each other by virtue of the flexibility of the cover fabric. However the strips are hingedly connected by the fabric of the cover 2, and it is within the scope of the invention to provide conventional types of hinge connections between the adjacent ends of the strips. For instance if desired the strips may be connected by a knuckle and pintle type of connection with the axis thereof extending in the direction of the stitching 5 and the longitudinal axis of the cover 2. While the cover is preferably made of a strong textile fabric other kinds of fabrics or sheet materials may be used, such as rubber, leatherette or any strong flexible sheet material which is available.

The present Pitot tube cover may find other uses on aircraft where analogous projecting elements of rod-like form are found. For example aircraft machine guns and cannon are usually provided with covers when the aircraft is on the ground and these covers may be built according to the principles of the present invention. Other uses may be found for the cover and latching means, even on larger projecting elements such as air scoops, gun turrets and propulsion auxiliaries.

The embodiments of the invention herein shown and described are to be regarded as illustrative only and it is to be understood that the invention is susceptible to variations, modifications and changes within the scope of the appended claims.

I claim:

1. A cover for a forwardly projecting member carried on an aircraft comprising, a fabric cover body adapted to enclose the free end of said forwardly projecting member, latching means for retaining said cover body in member-enclosing relation, and air pressure responsive means adapted to automatically release said latching means upon forward movement of said aircraft after reaching a predetermined rate of speed.

2. A cover for a forwardly projecting member carried on an aircraft comprising, a fabric cover body adapted to cover the free end of said forwardly projecting member, latching means for retaining said cover body in member-covering relation, and means responsive to air pressure developed upon forward movement of said aircraft after reaching a predetermined rate of speed for releasing said latching means.

3. A cover for a forwardly projecting member carried on an aircraft comprising, a fabric cover body adapted to be folded over the free end of said forwardly projecting member and over a portion of said member directly behind said free end to enclose the same, latching means to retain said cover body in the folded member-enclosing condition, and means responsive to air pressure developed upon forward movement of said aircraft for releasing said latching means.

4. A cover for a forwardly projecting member carried on an aircraft comprising, a rectangular fabric cover body adapted to be folded over the free end of said forwardly projecting member, oppositely projecting latching studs at opposite sides of the folded cover body, latching means adapted to engage said studs to retain said cover body in the folded condition, and means including a transversely-extending surface-forming element responsive to air pressure developed upon forward movement of said aircraft for releasing said latching means from said studs.

5. A cover for a forwardly projecting member carried on an aircraft comprising, a rectangular fabric cover body adapted to be folded over the free end of said forwardly projecting member, oppositely projecting latching studs at opposite sides of the folded cover body, latching means including spaced parallel spring arms adapted to engage said studs to retain said cover body in the folded condition, means connecting said spring arms and adapted to engage the lower edges of the cover body to thus provide a fulcrum point for use in releasing said latching means from said studs, and means connected to said spring arms including a transversely-extending surface-forming element responsive to air pressure developed upon forward movement of said aircraft for releasing said spring arms from said studs by a turning action of said latching means about said fulcrum point.

6. A cover for a forwardly projecting member carried on an aircraft comprising, a rectangular fabric cover body adapted to be folded over the free end of said forwardly projecting member and providing two similar depending cover portions, an L-shaped strip of sheet material secured to each of said similar cover portions along the forward and lower edges thereof, appositely projecting latching studs at opposite sides of the folded cover body, latching means including spaced parallel spring arms adapted to engage said studs to retain said cover body in the folded condition, means connecting said spring arms and adapted to engage the lower edges of the cover body to thus provide a fulcrum point for use in releasing said latching means from said studs, and means connected to said spring arms responsive to air pressure developed upon forward movement of said aircraft for releasing said spring arms from said studs by a turning action of said latching means about said fulcrum point.

7. A cover for a forwardly projecting member carried on an aircraft comprising, a rectangular fabric cover body adapted to be folded over the free end of said forwardly projecting member and providing two similar depending cover portions, an L-shaped strip of sheet material secured to each of said similar cover portions along the forward and lower edges thereof, latching means to retain said cover in the folded condition, and means responsive to air pressure developed upon forward movement of said aircraft for releasing said latching means.

8. A cover for a forwardly projecting aircraft accessory, such as a Pitot tube, which is normally mounted in the free air stream outside the confines of said aircraft, said cover comprising a flat flexible cover body adapted to be folded along a center line of the cover body to enclose the free end of said aircraft accessory and a portion of said accessory directly behind said free end, latching means to retain said cover body in the folded accessory-enclosing condition, and means attached to said cover body and responsive to air pressure developed upon forward movement of said aircraft to release said latching means, whereby upon release of said latching means said cover body and attached latch releasing means is blown free of said aircraft accessory.

9. A cover for a forwardly projecting aircraft accessory, such as a Pitot tube, which is normally mounted in the free air stream outside the confines of said aircraft, said cover comprising a flat flexible cover body adapted to be folded along a center line of the cover body to enclose the free end of said aircraft accessory and a portion of said accessory directly behind said free end, latching means to retain said cover body in the folded accessory-enclosing condition, and means including a transversely-extending surface-forming element responsive to air pressure developed upon forward movement of said aircraft to release said latching means, whereby upon release of said latching means said cover body is blown free of said aircraft accessory.

GEORGE R. LARKIN.

No references cited.